(12) United States Patent
Takeda et al.

(10) Patent No.: US 12,069,572 B2
(45) Date of Patent: Aug. 20, 2024

(54) MULTI-CELL SCHEDULING FOR POWER SAVING

(71) Applicant: QUALCOMM Incorporated, San Diego, CA (US)

(72) Inventors: Kazuki Takeda, Tokyo (JP); Huilin Xu, Temecula, CA (US); Peter Gaal, San Diego, CA (US); Masato Kitazoe, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 163 days.

(21) Appl. No.: 17/653,274

(22) Filed: Mar. 2, 2022

(65) Prior Publication Data

US 2023/0284134 A1   Sep. 7, 2023

(51) Int. Cl.
*H04W 52/02* (2009.01)
(52) U.S. Cl.
CPC ........... *H04W 52/0216* (2013.01); *H04W 52/0235* (2013.01)
(58) Field of Classification Search
CPC ......... H04W 52/0216; H04W 52/0235; H04W 52/0229; H04W 72/232; H04L 5/0092; H04L 5/0098; H04L 5/001
See application file for complete search history.

(56) References Cited

U.S. PATENT DOCUMENTS

| | | | |
|---|---|---|---|
| 2018/0317207 A1* | 11/2018 | Liao | H04L 5/0094 |
| 2019/0090267 A1 | 3/2019 | Li | |
| 2019/0159191 A1* | 5/2019 | Kim | H04W 76/27 |
| 2020/0313833 A1* | 10/2020 | Yi | H04L 5/001 |
| 2021/0274535 A1 | 9/2021 | Yi et al. | |
| 2023/0262699 A1* | 8/2023 | Kusashima | H04L 5/0053 |

FOREIGN PATENT DOCUMENTS

EP   3716698 A1   9/2020

OTHER PUBLICATIONS

International Search Report and Written Opinion—PCT/US2023/013218—ISA/EPO—May 30, 2023.

* cited by examiner

*Primary Examiner* — Dinh Nguyen
(74) *Attorney, Agent, or Firm* — Procopio, Cory, Hargreaves & Savitch

(57) ABSTRACT

This disclosure provides systems, devices, apparatus, and methods, including computer programs encoded on storage media, for multi-cell scheduling for power saving. A UE may receive a configuration of one or more first parameters for control channel monitoring based on a first type of scheduling and one or more second parameters for the control channel monitoring based on a second type of scheduling. The UE may monitor for DCI of the first type of scheduling based on a first condition of a scheduling cell and switch from monitoring for the DCI of the first type of scheduling to monitoring for the DCI of the second type of scheduling based on a second condition of a scheduled cell. The UE may receive scheduling information for at least one of a PDSCH or a PUSCH based on the second type of scheduling.

26 Claims, 11 Drawing Sheets

MULTI-CELL SCHEDULING FOR POWER SAVING

TECHNICAL FIELD

The present disclosure relates generally to communication systems, and more particularly, to a multi-cell scheduling for power saving.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive a configuration of one or more first parameters for control channel monitoring based on a first type of scheduling and one or more second parameters for the control channel monitoring based on a second type of scheduling; monitor for downlink control information (DCI) of the first type of scheduling based on a first condition of a scheduling cell; switch from monitoring for the DCI of the first type of scheduling to monitoring for the DCI of the second type of scheduling based on a second condition of a scheduled cell; and receive scheduling information for at least one of a physical downlink shared channel (PDSCH) or a physical uplink shared channel (PUSCH) based on the second type of scheduling.

In another aspect of the disclosure, a method, a computer-readable medium, and an apparatus are provided. The apparatus may transmit a configuration to switch between monitoring for DCI of a first type of scheduling based on a first condition of a scheduling cell and monitoring for the DCI of a second type of scheduling based on a second condition of a scheduled cell; and schedule at least one of a PDSCH or a PUSCH based on the configuration to switch between the monitoring of the DCI of the first type of scheduling and the monitoring for the DCI of the second type of scheduling.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
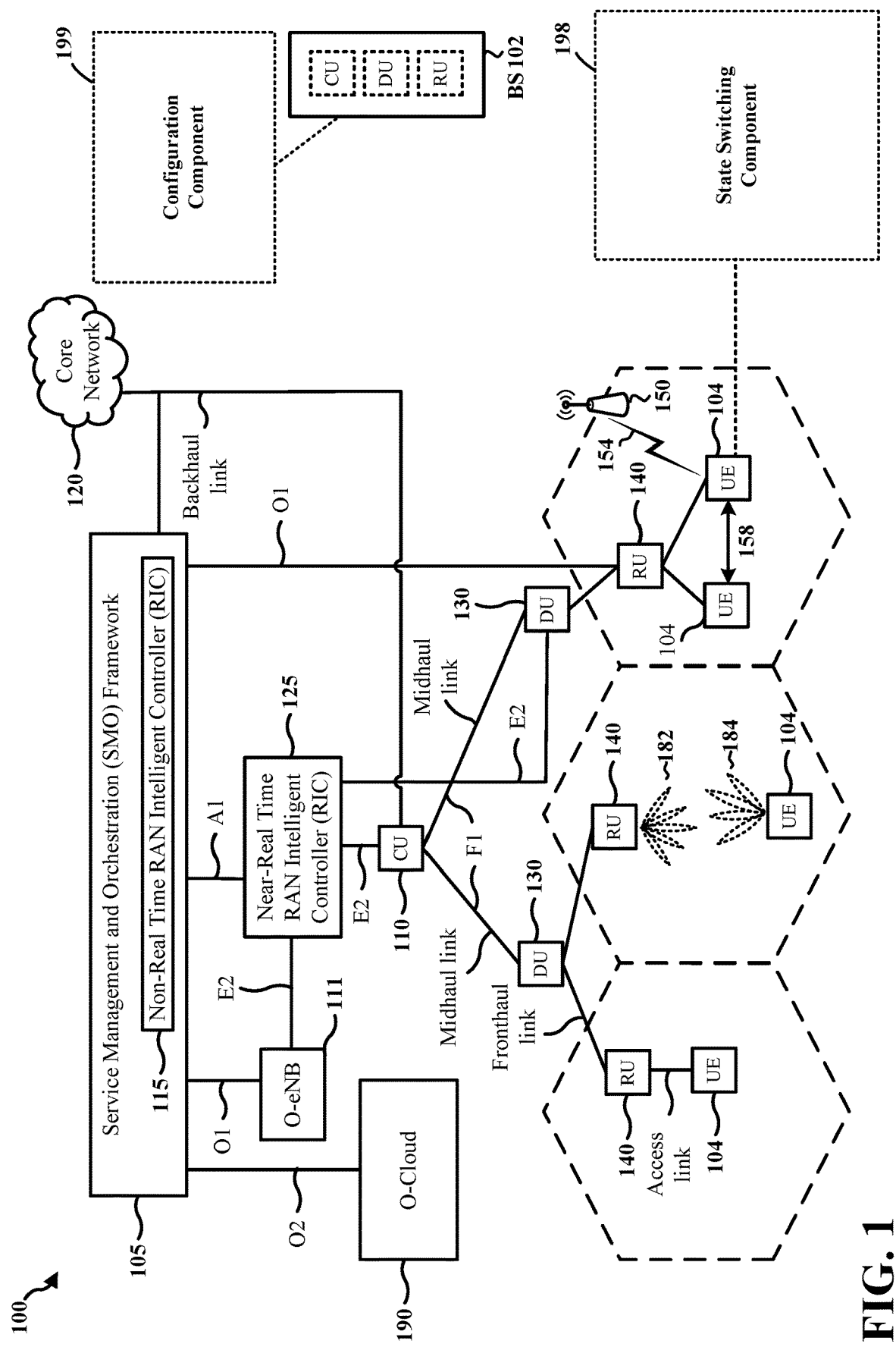
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device.

Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a state switching component 198 configured to receive a configuration of one or more first parameters for control channel monitoring based on a first type of scheduling and one or more second parameters for the control channel monitoring based on a second type of scheduling; monitor for downlink control information (DCI) of the first type of scheduling based on a first condition of a scheduling cell; switch from monitoring for the DCI of the first type of scheduling to monitoring for the DCI of the second type of scheduling based on a second condition of a scheduled cell; and receive scheduling information for at least one of a physical downlink shared channel (PDSCH) or a physical uplink shared channel (PUSCH) based on the second type of scheduling. In certain aspects, the base station 102 may include a configuration component 199 configured to transmit a configuration to switch between monitoring for DCI of a first type of scheduling based on a first condition of a scheduling cell and monitoring for the DCI of a second type of scheduling based on a second condition of a scheduled cell; and schedule at least one of a PDSCH or a PUSCH based on the configuration to switch between the monitoring of the DCI of the first type of scheduling and the monitoring for the DCI of the second type of scheduling. Although the following description may be focused on 5G NR, the concepts described herein may be applicable to other similar areas, such as LTE, LTE-A, CDMA, GSM, and other wireless technologies.

Figure 2:
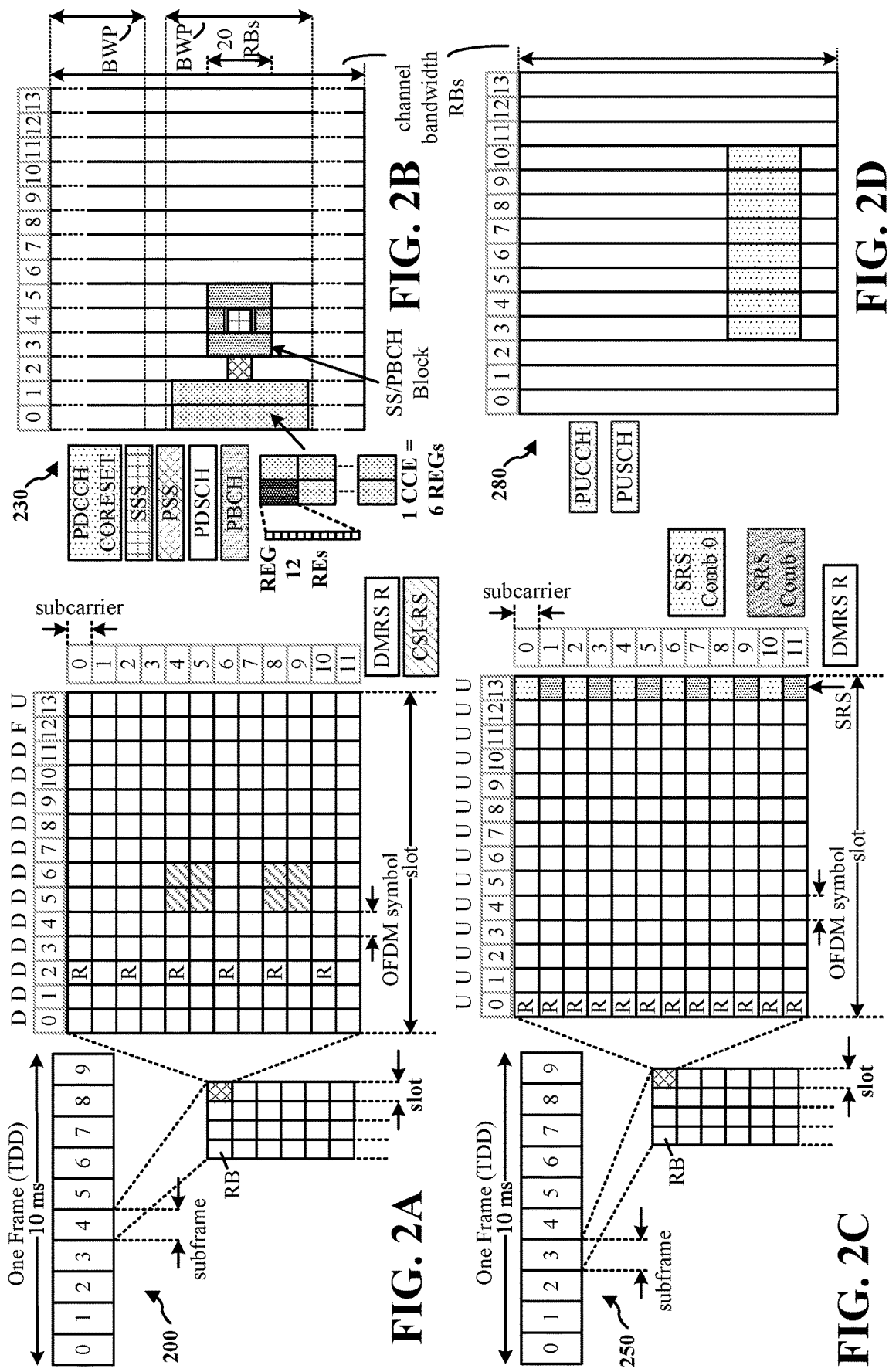
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DCI, or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
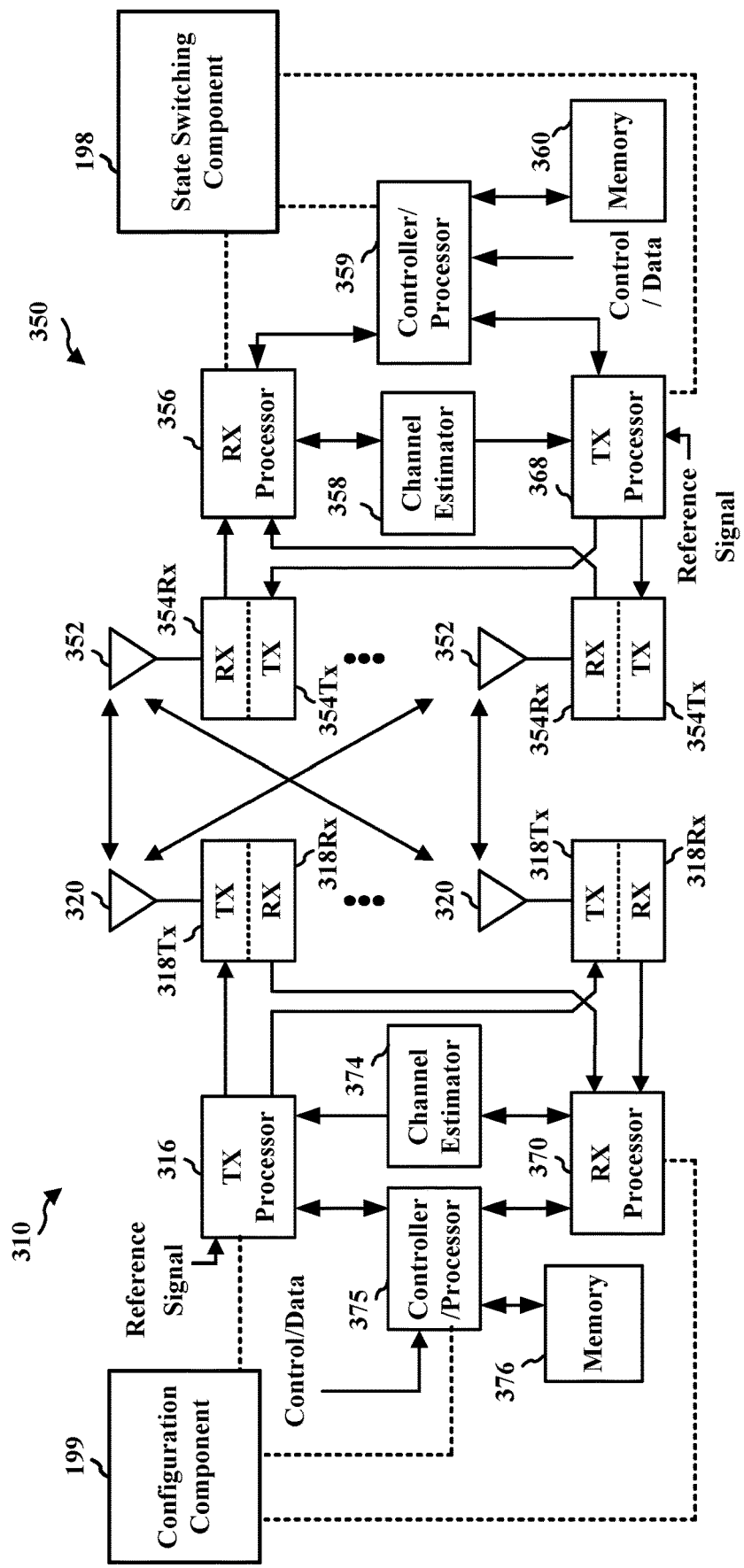
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the state switching component 198 of FIG. 1.

At least one of the TX processor 316, the RX processor 370, and the controller/processor 375 may be configured to perform aspects in connection with the configuration component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
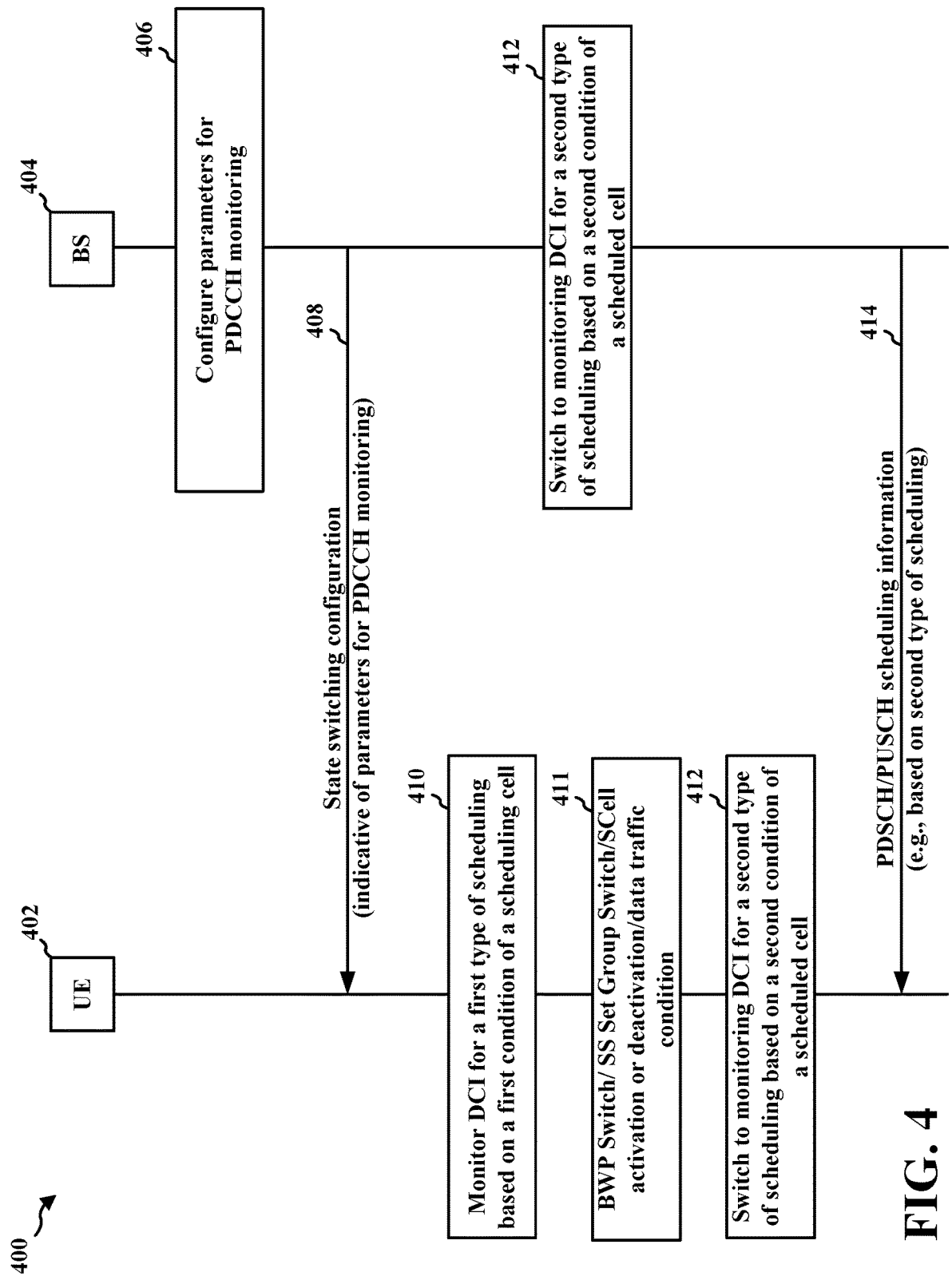
FIG. 4 is a call flow diagram illustrating communications between a UE and a base station.

FIG. 4 is a call flow diagram 400 illustrating communications between a UE 402 and a base station 404. Procedures associated with the diagram 400 may be based on balancing PDSCH/PUSCH scheduling flexibilities associated with an increased DCI payload, with PDSCH/PUSCH scheduling restrictions associated with a decreased DCI payload. Switching between different PDSCH/PUSCH scheduling techniques may provide a power savings at the UE 402 based on allowing the UE 402 to "sleep" at times where the UE 402 does not have to monitor for PDCCH from the base station 404, while also allowing for more scheduling flexibility for the UE at other times through use of a different scheduling technique.

At 406, the base station may configure parameters for PDCCH monitoring. The parameters may be indicative of a cross-carrier scheduling procedure, a multi-cell scheduling procedure, a single-cell scheduling procedure, etc. Cross-carrier scheduling may be based on a scheduling cell that schedules PDSCH/PUSCH on one or more other scheduled cells. Multi-cell scheduling may be based on a scheduling cell that schedules PDSCH/PUSCH on one or more scheduled cells over a plurality of slots. Single-cell scheduling/self-scheduling may be based on a scheduling cell that schedules PDSCH/PUSCH for its own cell. As an example, the base station 406 may configure parameters for multiple types of scheduling.

At 408, the base station 404 may transmit a state switching configuration to the UE 402 that indicates one or more conditions to the UE to switch between types of PDSCH/PUSCH scheduling. The state switching configuration may be indicative of the parameters for the PDCCH monitoring. For example, the state switch at the UE 402 may be between cross-carrier scheduling and single-cell scheduling, between multi-cell scheduling and single-cell scheduling, or between cross-carrier scheduling and multi-cell scheduling.

At 410, the UE 402 may monitor for DCI based on a first type of scheduling based on a first condition (e.g., as shown at 411) of a scheduling cell and, at 412, the UE 402 may switch to monitoring DCI for a second type of scheduling based on a second condition of a scheduled cell. For instance, the UE 402 may monitor for cross-carrier scheduling, multi-cell scheduling, and/or single-cell scheduling based on conditions such as BWP-switching, SSS group-switching, data traffic conditions, SCell activation or deactivation/dormancy, etc. At 414, the base station 404 may transmit PDSCH/PUSCH scheduling information to the UE 402, which may be based on the second type of scheduling that the UE 402 switched to monitoring for, at 412.

As shown at 411, the condition that triggers the switch to monitoring based on the second type of scheduling, at 412, may be based on one or more of a BWP switch, a SS set group switch, an amount of data traffic, an SCell activation, or an SCell deactivation.

Figure 5:
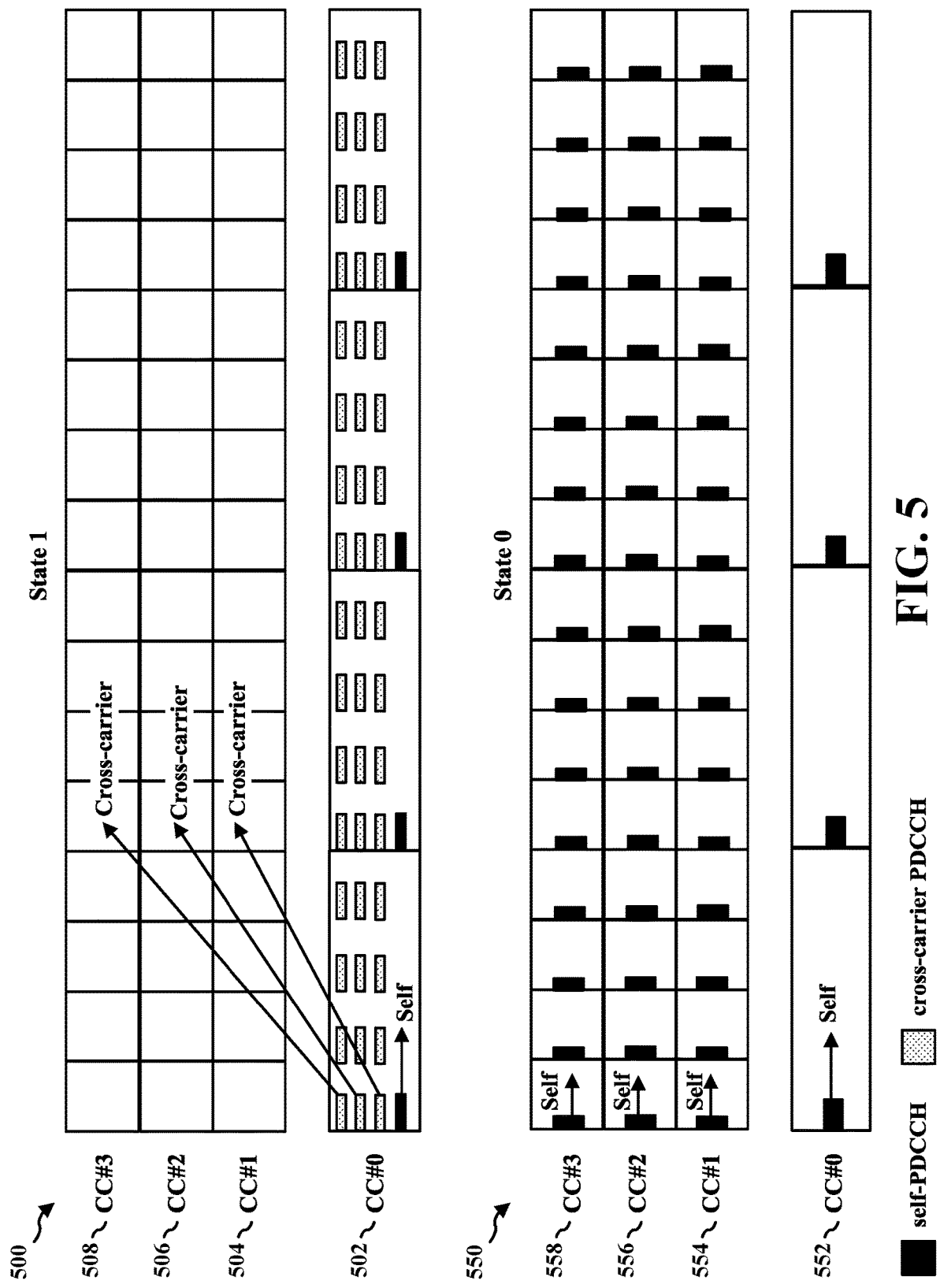
FIG. 5 includes diagrams that illustrate scheduling techniques for a plurality of component carriers (CCs).

FIG. 5 includes diagrams 500-550 that illustrate scheduling techniques for a plurality of component carriers (CCs). More specifically, the diagram 500 illustrates a cross-carrier scheduling technique from CC0 502 to CC1 504, CC2 506, and CC3 508, whereas the diagram 550 illustrates a self-scheduling technique for which each of CC0 552, CC1 554, CC2 556, and CC3 558 schedule their own data (e.g., PDSCH/PUSCH). The self-carrier scheduling technique may be associated with a scheduling state 0 (e.g., a first type of scheduling used at 410) of a UE and the cross-carrier scheduling technique may be associated with a scheduling state 1 (e.g., a second type of scheduling used at 412) of the UE. In other aspects, the self-carrier scheduling technique may be used at 412 and/or the cross-carrier scheduling technique may be used at 410.

Carrier aggregation (CA) operations may be enhanced in some cases based on multi-cell PUSCH/PDSCH scheduling (e.g., one PDSCH/PUSCH per cell) via a single DCI. Some DCI formats may be configured to schedule PDSCH/PUSCH on one cell at a time, whereas other DCI formats may be configured to schedule PDSCH/PUSCH on multiple cells at a time. Multi-cell PUSCH/PDSCH scheduling techniques may include identifying a maximum number of cells that may be scheduled simultaneously, may be based on intra-band and/or inter-band CA operations, may utilize frequency range (FR)1 and/or FR2, etc.

Multi-cell PUSCH/PDSCH scheduling may be used to conserve power at the UE, as the UE may consume an increased amount of power when the UE is configured to monitor PDCCH for each of a plurality of CCs. In the diagram 550, the self-scheduling technique is performed, where self-PDCCHs for each CC may be monitored on a same CC that carriers the self-PDCCHs. The UE may be configured based on 4 CCs (e.g., CC0 552-CC3 558). CC0 552 may be an FR1 CC that includes a longer slot duration than CC1 554-CC3 558, which may be FR2 CCs. Once per slot the UE may monitor for PDCCH on each of the plurality of CCs.

In the diagram 500, a cross-carrier scheduling technique is performed, where cross-carrier PDCCHs for one or more of the plurality of CCs may be monitored on a single CC. For example, the PDCCHs for CC1 504-CC3 508 may be monitored on CC0 502 based on a cross-carrier scheduling configuration. While the UE may be configured to monitor for cross-carrier scheduling from CC0 502 to CC1 504-CC3 508, the UE may also monitor for self-PDCCH for on CC0 502 based on the self-scheduling technique. For each of the CCs and each of the slots, the UE may monitor for PDCCH multiple times per slot in the scheduling cell (e.g., CC0 502), such that the UE may not have to monitor PDCCH on the other carriers (e.g., CC1 504-CC3 508). However, CC0 502 may include an increased number of PDCCH candidates to be monitored by the UE for cross-carrier scheduling operations associated with FR2 carriers (e.g., CC1 504-CC3 508). Multi-cell PDSCH/PUSCH scheduling via a single DCI may reduce the power consumption and/or processing complexity of the UE associated with PDCCH monitoring, as a single DCI may be used to schedule PDSCH/PUSCH on a plurality of cells/slots.

Figure 6:
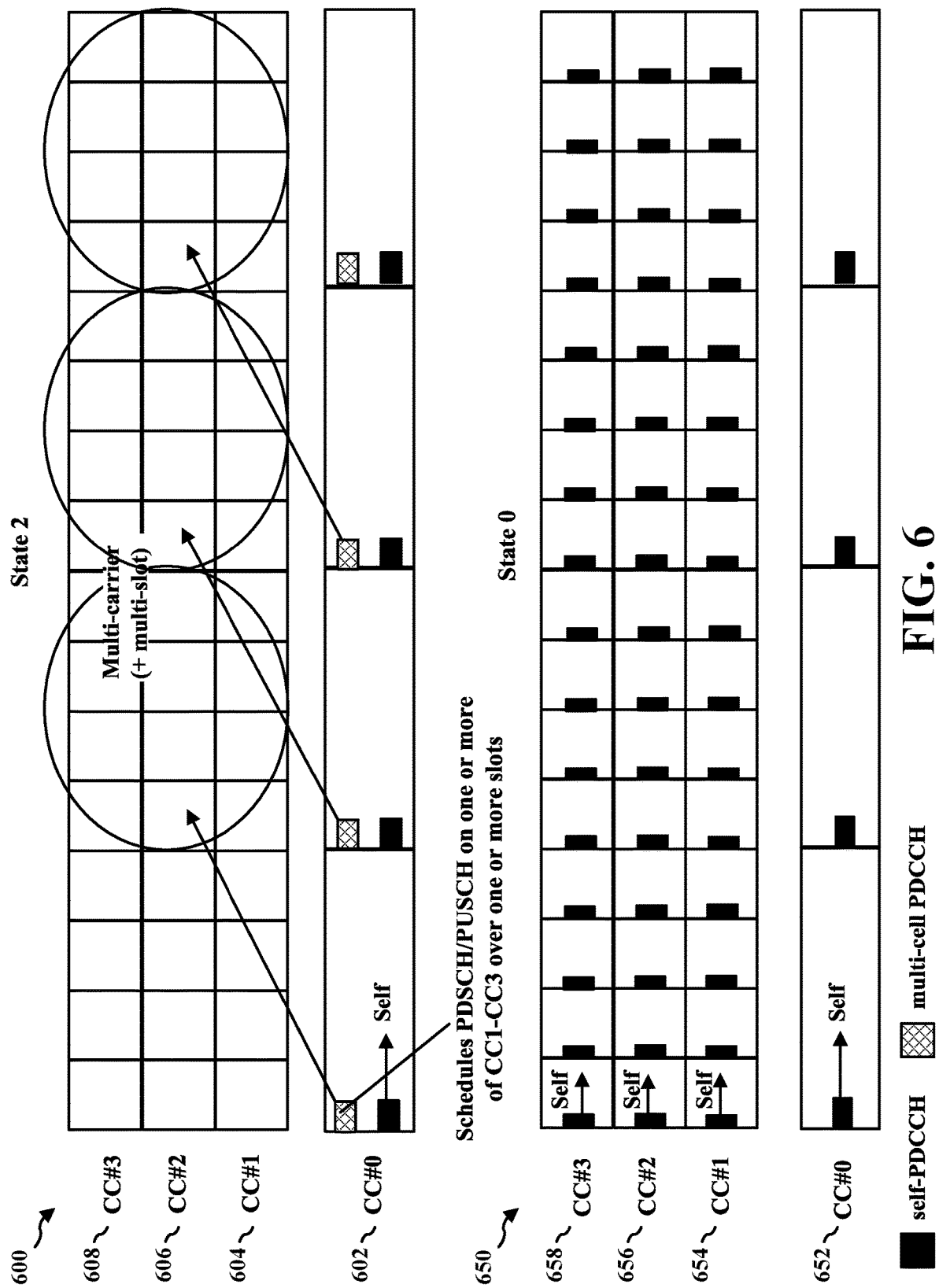
FIG. 6 includes diagrams that illustrate scheduling techniques for a plurality of CCs.

FIG. 6 includes diagrams 600-650 that illustrate scheduling techniques for a plurality of CCs, which may be referred to as multi-carrier scheduling or multi-cell scheduling. More specifically, the diagram 600 illustrates a multi-cell scheduling technique from CC0 602 to CC1 604, CC2 606, and CC3 608, whereas the diagram 650 illustrates a self-scheduling technique for which each of CC0 652, CC1 654, CC2 656, and CC3 658 schedule their own data (e.g., PDSCH/PUSCH). The self-carrier scheduling technique may be associated with the scheduling state 0 (e.g., at 410) of the UE and the multi-cell scheduling technique may be associated with a scheduling state 2 (e.g., at 412) of the UE. In other aspects, the self-carrier scheduling technique may be used at 412 and/or the multi-cell scheduling technique may be used at 410. In the multi-cell scheduling technique of the diagram 600, CC0 602 may schedule PDSCH/PUSCH on one or more of CC1 604-CC3 608 over one or more slots as well as self-schedule PDSCH/PUSCH on CC0 602.

Multi-cell PDSCH/PUSCH scheduling via a single DCI may be similar to cross-carrier scheduling in that PDCCH for multiple CCs may be monitored on a single CC. In an example that includes 4 CCs (e.g., CC0 602-CC3 608), 3 of the CCs (e.g., CC1 604-CC3 608) may be based on FR2 and 1 of the CCs (e.g., CC0 602) may be based on FR1. Further, the FR2 CC s may have a shorter slot duration than the FR1 CC. Just as cross-carrier scheduling may be configured from CC0 502 to CC1 504-CC3 508, the multi-cell PDSCH/PUSCH scheduling may be similarly configured from CC0 602 to CC 604-CC3 608. In such cases, the UE may monitor PDCCH on CC0 602, but different from cross-carrier scheduling, the monitoring may be performed once per slot.

Multi-cell PDSCH/PUSCH scheduling may be based on multi-cell single-slot scheduling or multi-cell multi-slot scheduling. For multi-cell single-slot scheduling, PDCCH of CC0 602 may schedule PDSCH/PUSCH on multiples CCs (e.g., CC1 604-CC3 608) of a single slot. Multi-cell multi-slot scheduling may be an enhancement to multi-cell single-slot scheduling. For example, the multi-cell PDCCH of CC0 602 may include a DCI format for multi-cell scheduling, such that one or more PDSCH/PUSCH may be scheduled on one or more CCs (e.g., CC1 604-CC3 608) over one or more slots. Thus, the DCI may be used to not only schedule PDSCH/PUSCH on multiple cells, but also on multiple slots. The diagram 600 illustrates that the DCI format may be used to schedule data on up to 3 CCs and on up to 4 slots at a same time. The UE may monitor a multi-cell PDCCH candidate on CC0 602 to receive the scheduling information for other carriers, such as CC1 602-CC3 608. While the UE may still monitor for the DCI format on CC0 602, the UE does not have to monitor for multiple PDCCH candidates on the scheduling cell (e.g., CC0 602).

A decreased number of PDCCH monitoring occasions may allow the UE to perform an increased number of micro-sleep sessions, which may conserve power at the UE during the time that the UE is not monitoring for other PDCCH candidates on CC0 602. Instead, the UE may monitor for the multi-cell PDCCH associated with CC1 604-CC3 608 once per slot based on when the data is actively scheduled via the DCI format. The DCI format may be configured for multi-cell PDSCH/PUSCH scheduling in some cases without multi-slot scheduling. In other cases, the DCI format may be configured for multi-cell PDSCH/PUSCH scheduling with multi-slot scheduling.

The DCI format may include scheduling information for the scheduled carriers and/or the scheduled slots in a single channel. The DCI used for the multi-cell PDSCH/PUSCH scheduling may carry control/scheduling information for PDSCH/PUSCH over one or more CCs for one or more slots. The DCI may also include a field that indicates a resource allocation, a HARQ process, a modulation and coding scheme (MCS) determination, antenna port information, a transmission configuration indicator (TCI), etc., for individual PDSCH/PUSCH on each scheduled carrier/slot. For example, the DCI may include MIMO-related indications for the individual PDSCH/PUSCH on each of the scheduled carriers/slots. Including such indications in the DCI format may increase a size of the DCI format in association with the carrier information for the scheduled data.

In further examples, the DCI may include a field that commonly indicates the resource allocation, the HARQ process, the MCS determination, the antenna port information, the TCI, etc., for the PDSCH/PUSCH over multiple slots and/or multiple scheduled CCs. For instance, if the resource allocation corresponds to common information across each of CC1 604-CC3 608, one field in the DCI may be used to indicate a frequency domain resource allocation (FDRA), which may be applied across CC1 604-CC3 608. Such techniques may reduce overhead associated with the DCI format, but may also decrease a granularity of the scheduling information. Thus, the DCI for the multi-cell PDSCH/PUSCH scheduling may include a tradeoff between scheduling flexibilities associated with an increased DCI payload and scheduling restrictions associated with a decreased DCI payload.

In order to balance the scheduling flexibilities with the decreased DCI payload and power savings at the UE, the UE may be configured to switch between the multi-cell scheduling of the diagram 600 and the cross-carrier scheduling of the diagram 500 or between multi-cell scheduling and single cell scheduling, based on certain conditions. In scheduling state 2, the UE may monitor the DCI for multi-cell PDSCH/PUSCH scheduling on multiple carriers/slots. That is, the UE may monitor PDCCH on CC0 602, which may be used for multi-cell scheduling on CC1 604-CC3 608. However, the DCI may include inefficiencies associated with either an increased payload size or decreased scheduling flexibility. DCI used for multi-cell scheduling in the diagram 600 may be associated with a power-saving state of the UE.

In scheduling state 0, the UE may be configured to monitor DCI for single-cell PDSCH/PUSCH scheduling on each carrier/slot. DCI used for single-cell scheduling of the diagram 650 may be associated with an active state of the UE and may increase the granularity of the scheduling information based on an increased DCI payload for each scheduled CC (e.g., CC1 654-CC3 658). The UE may have increased power consumption during active data transmission/reception. When data traffic is low (e.g., a decreased amount of data traffic is received by the UE), the UE may be configured in state 2 and may monitor for multi-cell PDCCH on one of the CCs (e.g., CC0 602) with increased speed, which may provide a power-savings at the UE. Once the data traffic is received by the UE, the multi-cell PDCCH may schedule the data on the remaining carriers (e.g., CC1 604-CC3 608). The UE may then switch to state 0 and begin monitoring for the PDCCH on the other scheduled CCs.

State-switching operations may be performed by the UE in association with a switch of the scheduling cell. In state 2, the scheduling cell may be CC0 602 for CC1 604-CC3 608, but in state 0, the scheduling cell may be each of the CCs (e.g., based on a self-scheduling technique). The UE may be configured to switch between the self-scheduling technique of the diagram 550 and the cross-carrier scheduling technique of the diagrams 500. The UE may also be configured to switch between the multi-carrier scheduling technique of the diagram 600 and the single/self-carrier scheduling technique of the diagram 650. In state 2, the UE may perform the multi-carrier scheduling based on a single DCI format, but in state 0 the DCI format may be indicative of one scheduled cell.

The UE may be configured with parameters for PDCCH monitoring in state 0 and state 2, and the UE may switch between scheduling configurations associated with state 0 and state 2. The switch may be based on an occurrence of one or more conditions. As an example, each CC may include multiple BWPs and, for each of the CCs, the UE may support BWP-switching. In a first aspect, the state switch of the UE may be based on the BWP-switching. PDCCH monitoring for multi-cell scheduling to a set of scheduled cells may be configured for a first BWP of a scheduling cell. When a first BWP is active, e.g., if the UE switches to the first BWP, multi-cell scheduling to the set of scheduled cells may be active and the UE may monitor for multi-cell scheduling from a base station. PDCCH monitoring for single-cell scheduling may also be configured for a second BWP of each scheduled cell. When the second BWP is active, e.g., if the UE switches to the second BWP, the UE may monitor PDCCH for single-cell scheduling/self-scheduling, and the UE may monitor for single-cell scheduling or self-scheduling from the base station. State 2 may be configured in the scheduling cell and state 0 may be configured in each scheduled cell. The BWP switch may be in response to an indication from a base station, such as in DCI indicating for the UE to switch to a particular BWP or in an RRC configuration. The BWP switch may be in response to expiration of a timer or another BWP switch condition. Based on the BWP-switching triggered by a DCI indication, an RRC configuration, or a BWP-InactivityTimer expiration, multi-cell scheduling for a set of serving cells may be activated/deactivated (e.g., the state switching may be performed) based on a type of scheduling associated with the current, active BWP for the UE.

In a second aspect, the state switch of the UE may be based on search space set (SSS) group-switching, which may provide the power savings to the UE. The SSS group-switching may be associated with a switch between the self-scheduling of the diagram 550 and the cross-carrier scheduling of the diagram 500, or the single-cell scheduling of the diagram 650 and the multi-cell scheduling of the diagram 600. The UE may be configured with multiple SSS groups, where a first subset of the SSS groups may enable, or be associated with, the multi-cell scheduling and a second subset of the SSS groups may not enable the multi-cell scheduling, or may be associated with single-cell scheduling. For example, if group 1=SSS for multi-cell scheduling from CC0 602 to CC1 604/CC2 606/CC3 608, the SSS for single-cell scheduling may be on CC0 602. In further examples, group 2=SSS for single-cell scheduling on CC0 652, CC1 654, CC2 656, and CC3 658. The UE may receive an indication of the SS set group from a base station, such as in a DCI indication. Based on the DCI indication or a searchSpaceSetSwitchTimer expiration, the multi-cell scheduling for a set of serving cells may activated/deactivated (e.g., the state switching may be performed).

In a third aspect, the state switch of the UE may be based on data traffic. PDCCH monitoring for multi-cell scheduling from a scheduling cell to a set of scheduled cells as well as PDCCH monitoring for single-cell scheduling may be configured to the UE. If there is no data scheduling by a PDCCH for scheduled cells in the multi-cell scheduling for a certain time period, the UE may monitor PDCCH for multi-cell scheduling. That is, if there is no data traffic for a defined period of time or a threshold amount of time, then the UE may switch to state 2. However, if the UE detects data scheduling to a scheduled cell in the multi-cell scheduling, the UE may monitor PDCCH for single-cell scheduling (e.g., based on switching from state 2 to state 0).

In a fourth aspect, the state switch of the UE may be based on SCell activation or deactivation (e.g., SCell dormancy). If the SCell is deactivated/dormant, the UE may not monitor PDCCH for the SCell. Thus, the UE may perform the state switch based on the activation or the deactivation/dormancy. PDCCH monitoring for multi-cell scheduling from a scheduling cell to a set of scheduled cells as well as PDCCH monitoring for single-cell scheduling may be configured to the UE. If the SCells for the multi-cell scheduling are active, the UE may monitor PDCCH for multi-cell scheduling. If one or more SCells for the multi-cell scheduling are deactivated/dormant, the UE may not monitor PDCCH for multi-cell scheduling, and may instead monitor PDCCH for single-cell scheduling (e.g., at least for the scheduled cells that remain active).

Accordingly, the UE may support state switching between state 2 of the diagram 600 (e.g., monitoring DCI for multi-cell scheduling) and state 0 of the diagram 650 (e.g., monitoring DCI for self/single-cell scheduling) based on certain conditions. In addition to the state switching between multi-cell scheduling and self-scheduling, the state switching may also correspond to state switching between state 1 of the diagram 500 (e.g., monitoring DCI for cross-carrier scheduling) and state 0 of the diagram 550 (e.g., monitoring DCI for self-scheduling) based on the certain conditions. Hence, even without multi-cell scheduling, cross-carrier scheduling techniques may be enhanced to enable the state switching based on the certain conditions.

Figure 7:
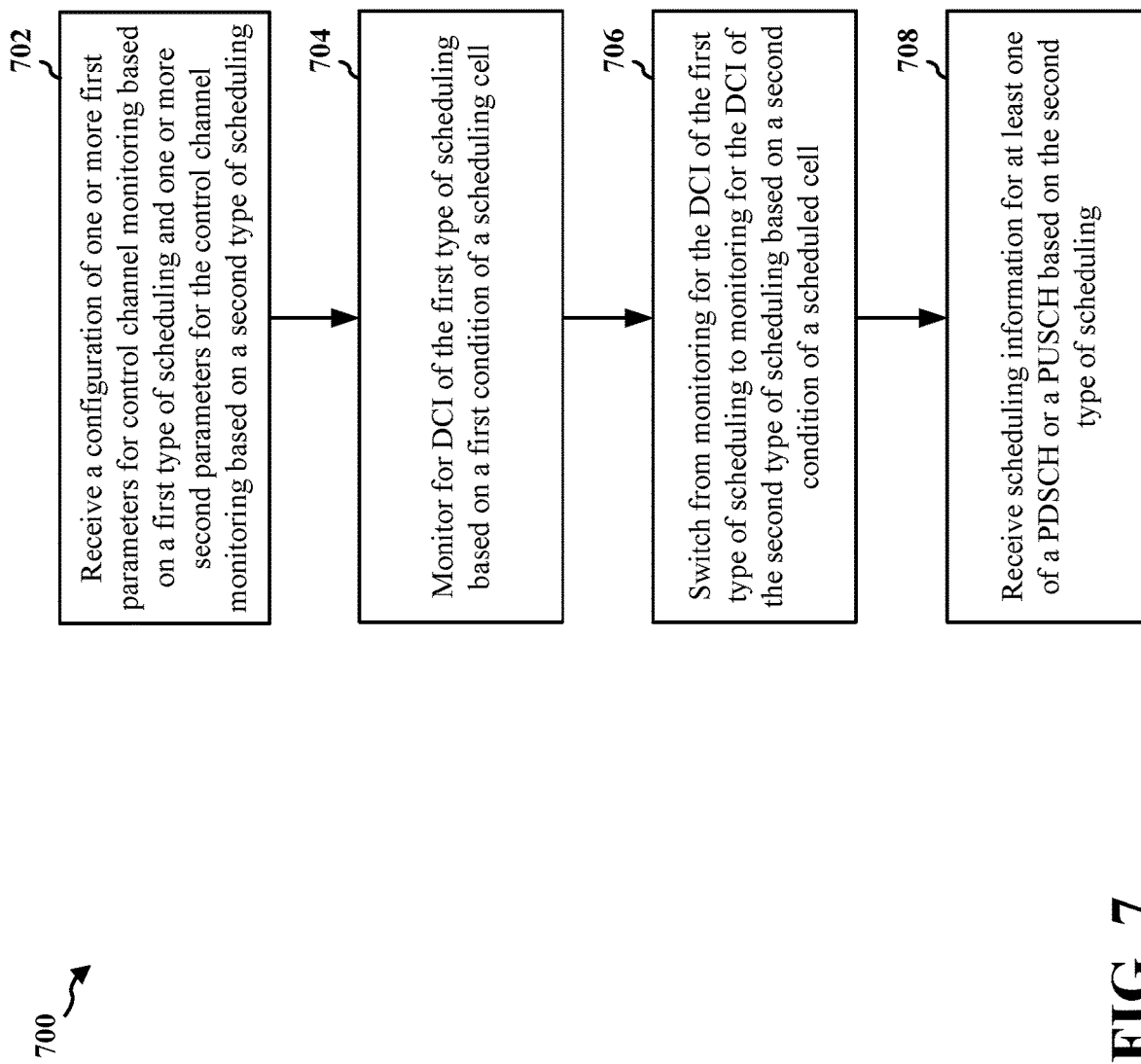
FIG. 7 is a flowchart of a method of wireless communication at a UE.

FIG. 7 is a flowchart 700 of a method of wireless communication. The method may be performed by a UE (e.g., the UE 104/402, the apparatus 1104, etc.), which may include the memory 360 and which may be the entire UE 104/402 or a component of the UE 104/402, such as the TX processor 368, the RX processor 356, and/or the controller/processor 359. The method may be performed to conserve power at the UE 104/402.

At 702, the UE may receive a configuration of one or more first parameters for control channel monitoring based on a first type of scheduling and one or more second parameters for the control channel monitoring based on a second type of scheduling. For example, referring to FIGS. 4-6, the UE 402 may receive, at 408, an indication of parameters for PDCCH monitoring from the base station 404. The parameters may be indicative of cross-carrier scheduling of the diagram 500, multi-cell scheduling of the diagram 600, and/or single-cell scheduling of the diagrams 550/650. The reception, at 702, may be performed by the state switching component 198 of the UE 104/350 or the apparatus 1104 of FIGS. 1-3 and 11.

At 704, the UE may monitor for DCI of the first type of scheduling based on a first condition of a scheduling cell. For example, referring to FIG. 4, the UE 402 may monitor, at 410, DCI for a first type of scheduling based on a first condition of a scheduling cell. For instance, the UE 402 may monitor for cross-carrier scheduling, multi-cell scheduling, and/or single-cell scheduling based on conditions such as BWP-switching, SSS group-switching, data traffic conditions, SCell activation or deactivation/dormancy, etc. The monitoring, at 704, may be performed by the state switching component 198 of the UE 104/350 or the apparatus 1104 of FIGS. 1-3 and 11.

At 706, the UE may switch from monitoring for the DCI of the first type of scheduling to monitoring for the DCI of the second type of scheduling based on a second condition of a scheduled cell. For example, referring to FIGS. 4-6, the UE 402 may switch, at 412, to monitoring DCI for a second type of scheduling based on a second condition of a scheduled cell. For instance, the UE 402 may switch between cross-carrier scheduling of the diagram 500 and single-cell scheduling of the diagram 550, between multi-cell scheduling of the diagram 600 and single-cell scheduling of the diagram 650, or between cross-carrier scheduling of the diagram 500 and multi-cell scheduling of the diagram 600. The switching, at 706, may be performed by the state switching component 198 of the UE 104/350 or the apparatus 1104 of FIGS. 1-3 and 11.

At 708, the UE may receive scheduling information for at least one of a PDSCH or a PUSCH based on the second type of scheduling. For example, referring to FIG. 4, the UE 402 may receive, at 414, PDSCH/PUSCH scheduling information from the base station 404 (e.g., based on the second type of scheduling). The reception, at 708, may be performed by the state switching component 198 of the UE 104/350 or the apparatus 1104 of FIGS. 1-3 and 11.

Figure 8:
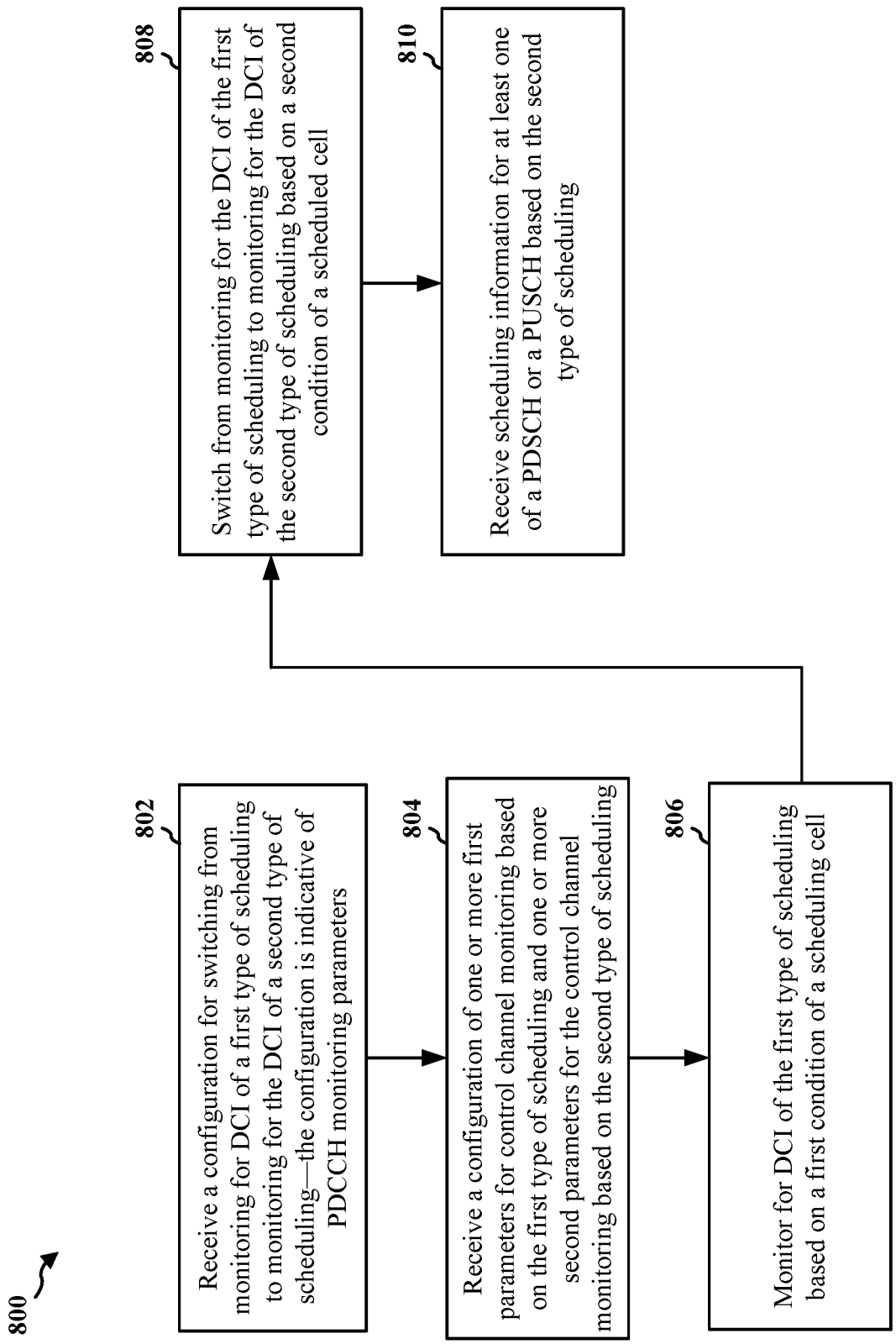
FIG. 8 is a flowchart of a method of wireless communication at a UE.

FIG. 8 is a flowchart 800 of a method of wireless communication. The method may be performed by a UE (e.g., the UE 104/402, the apparatus 1104, etc.), which may include the memory 360 and which may be the entire UE 104/402 or a component of the UE 104/402, such as the TX processor 368, the RX processor 356, and/or the controller/processor 359. The method may be performed to conserve power at the UE 104/402.

At 802, the UE may receive a configuration for switching from monitoring for DCI of a first type of scheduling to monitoring for the DCI of a second type of scheduling—the configuration is indicative of PDCCH monitoring parameters. For example, referring to FIG. 4, the UE 402 may receive, at 408, a state switching configuration from the base station 404. The state switching configuration received, at 408, from the base station 404 may be indicative of parameters for PDCCH monitoring. The reception, at 802, may be performed by the state switching component 198 of the UE 104/350 or the apparatus 1104 of FIGS. 1-3 and 11.

At 804, the UE may receive a configuration of one or more first parameters for control channel monitoring based on the first type of scheduling and one or more second parameters for the control channel monitoring based on the second type of scheduling. For example, referring to FIGS. 4-6, the UE 402 may receive, at 408, an indication of parameters for PDCCH monitoring from the base station 404. The parameters may be indicative of cross-carrier scheduling of the diagram 500, multi-cell scheduling of the diagram 600, and/or single-cell scheduling of the diagrams 550/650. The reception, at 804, may be performed by the state switching component 198 of the UE 104/350 or the apparatus 1104 of FIGS. 1-3 and 11.

At 806, the UE may monitor for DCI of the first type of scheduling based on a first condition of a scheduling cell. For example, referring to FIG. 4, the UE 402 may monitor, at 410, DCI for a first type of scheduling based on a first condition of a scheduling cell. For instance, the UE 402 may monitor for cross-carrier scheduling, multi-cell scheduling, and/or single-cell scheduling based on conditions such as BWP-switching, SSS group-switching, data traffic conditions, SCell activation or deactivation/dormancy, etc. The monitoring, at 806, may be performed by the state switching component 198 of the UE 104/350 or the apparatus 1104 of FIGS. 1-3 and 11.

At 808, the UE may switch from monitoring for the DCI of the first type of scheduling to monitoring for the DCI of the second type of scheduling based on a second condition of a scheduled cell. For example, referring to FIGS. 4-6, the UE 402 may switch, at 412, to monitoring DCI for a second type of scheduling based on a second condition of a scheduled cell. For instance, the UE 402 may switch between cross-carrier scheduling of the diagram 500 and single-cell scheduling of the diagram 550, between multi-cell scheduling of the diagram 600 and single-cell scheduling of the diagram 650, or between cross-carrier scheduling of the diagram 500 and multi-cell scheduling of the diagram 600. The switching, at 808, may be performed by the state switching component 198 of the UE 104/350 or the apparatus 1104 of FIGS. 1-3 and 11.

At 810, the UE may receive scheduling information for at least one of a PDSCH or a PUSCH based on the second type of scheduling. For example, referring to FIG. 4, the UE 402 may receive, at 414, PDSCH/PUSCH scheduling information from the base station 404 (e.g., based on the second type of scheduling). The reception, at 810, may be performed by the state switching component 198 of the UE 104/350 or the apparatus 1104 of FIGS. 1-3 and 11.

Figure 9:
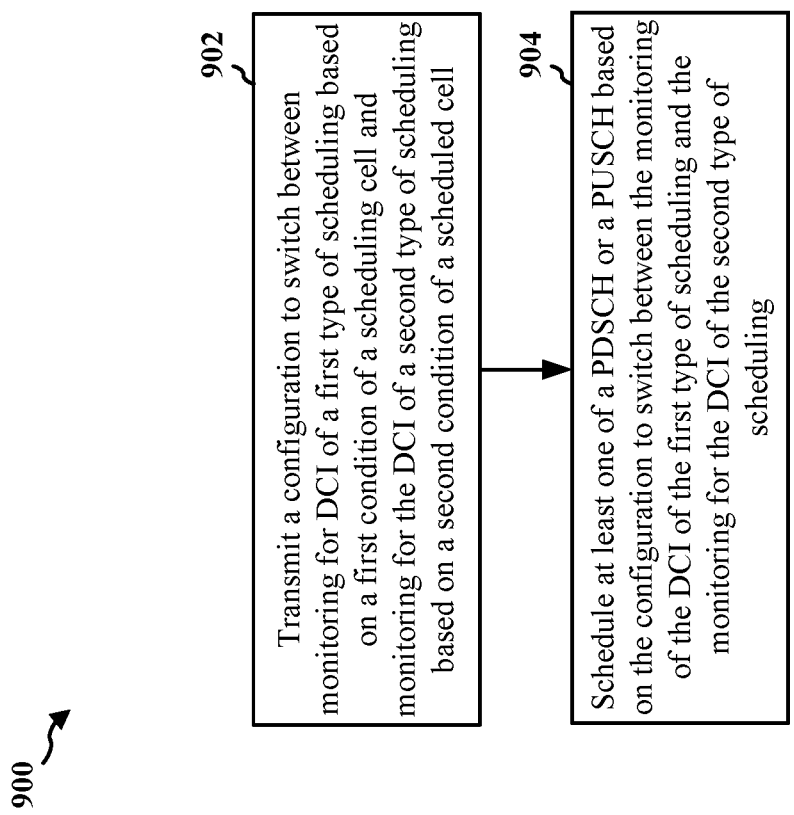
FIG. 9 is a flowchart of a method of wireless communication at a base station.

FIG. 9 is a flowchart 900 of a method of wireless communication. The method may be performed by a network node or a base station (e.g., the base station 102/404, the apparatus 1104; etc.), which may include the memory 376 and which may be the entire base station 102/404 or a component of the base station 102/404, such as the TX processor 316, the RX processor 370, and/or the controller/processor 375. The method may be performed for power conservation at a UE 104/402.

At 902, the base station or a network node may transmit a configuration to switch between monitoring for DCI of a first type of scheduling based on a first condition of a scheduling cell and monitoring for the DCI of a second type of scheduling based on a second condition of a scheduled cell. For example, referring to FIGS. 4-6, the base station 404 may transmit, at 408, a state switching configuration to the UE 402 (e.g., indicative of the parameters for PDCCH monitoring). For instance, the state switching may be between cross-carrier scheduling of the diagram 500 and single-cell scheduling of the diagram 550, between multi-cell scheduling of the diagram 600 and single-cell scheduling of the diagram 650, or between cross-carrier scheduling of the diagram 500 and multi-cell scheduling of the diagram 600 based on conditions such as BWP-switching, SSS group-switching, data traffic conditions, SCell activation or deactivation/dormancy, etc. The transmission, at 902, may be performed by the configuration component 199 of the base station 102/310 or the network entity 1102 of FIGS. 1-3 and 11.

At 904, the base station or a network node may schedule at least one of a PDSCH or a PUSCH based on the configuration to switch between the monitoring of the DCI of the first type of scheduling and the monitoring for the DCI of the second type of scheduling. For example, referring to FIG. 4, the base station 404 may transmit, at 414, PDSCH/PUSCH scheduling information to the UE 402 based on the configuration, at 406, of the parameters for PDCCH monitoring. The scheduling, at 904, may be performed by the configuration component 199 of the base station 102/310 or the network entity 1102 of FIGS. 1-3 and 11.

Figure 10:
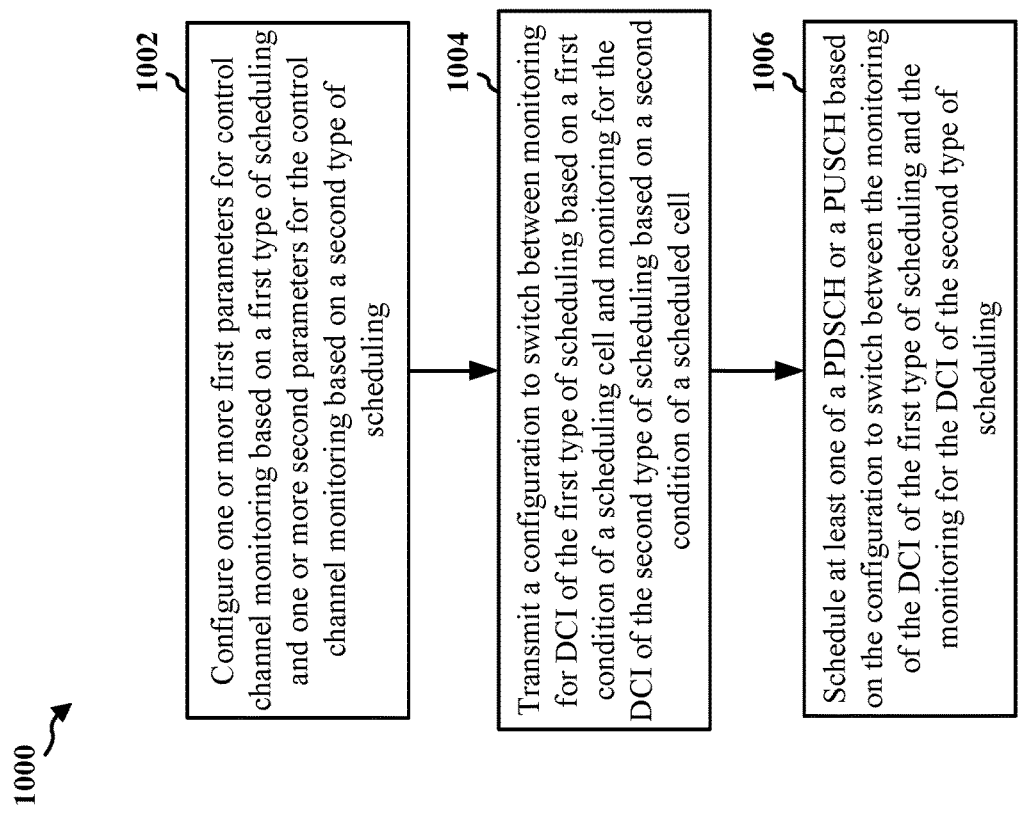
FIG. 10 is a flowchart of a method of wireless communication at a base station.

FIG. 10 is a flowchart 1000 of a method of wireless communication. The method may be performed by a network node or a base station (e.g., the base station 102/404, the apparatus 1104; etc.), which may include the memory 376 and which may be the entire base station 102/404 or a component of the base station 102/404, such as the TX processor 316, the RX processor 370, and/or the controller/processor 375. The method may be performed for power conservation at a UE 104/402.

At 1002, the base station or a network node may configure one or more first parameters for control channel monitoring based on a first type of scheduling and one or more second parameters for the control channel monitoring based on a second type of scheduling. For example, referring to FIG. 4, the base station 404 may configure, at 406, parameters for PDCCH monitoring at the UE 402. The configuration, at 1002, may be performed by the configuration component 199 of the base station 102/310 or the network entity 1102 of FIGS. 1-3 and 11.

At 1004, the base station or a network node may transmit a configuration to switch between monitoring for DCI of the first type of scheduling based on a first condition of a scheduling cell and monitoring for the DCI of the second type of scheduling based on a second condition of a scheduled cell. For example, referring to FIGS. 4-6, the base station 404 may transmit, at 408, a state switching configuration to the UE 402 (e.g., indicative of the parameters for PDCCH monitoring). For instance, the state switching may be between cross-carrier scheduling of the diagram 500 and single-cell scheduling of the diagram 550, between multi-cell scheduling of the diagram 600 and single-cell scheduling of the diagram 650, or between cross-carrier scheduling of the diagram 500 and multi-cell scheduling of the diagram 600 based on conditions such as BWP-switching, SSS group-switching, data traffic conditions, SCell activation or deactivation/dormancy, etc. The transmission, at 1004, may be performed by the configuration component 199 of the base station 102/310 or the network entity 1102 of FIGS. 1-3 and 11.

At 1006, the base station or a network node may schedule at least one of a PDSCH or a PUSCH based on the configuration to switch between the monitoring of the DCI of the first type of scheduling and the monitoring for the DCI of the second type of scheduling. For example, referring to FIG. 4, the base station 404 may transmit, at 414, PDSCH/PUSCH scheduling information to the UE 402 based on the configuration, at 406, of the parameters for PDCCH monitoring. The scheduling, at 1006, may be performed by the configuration component 199 of the base station 102/310 or the network entity 1102 of FIGS. 1-3 and 11.

Figure 11:
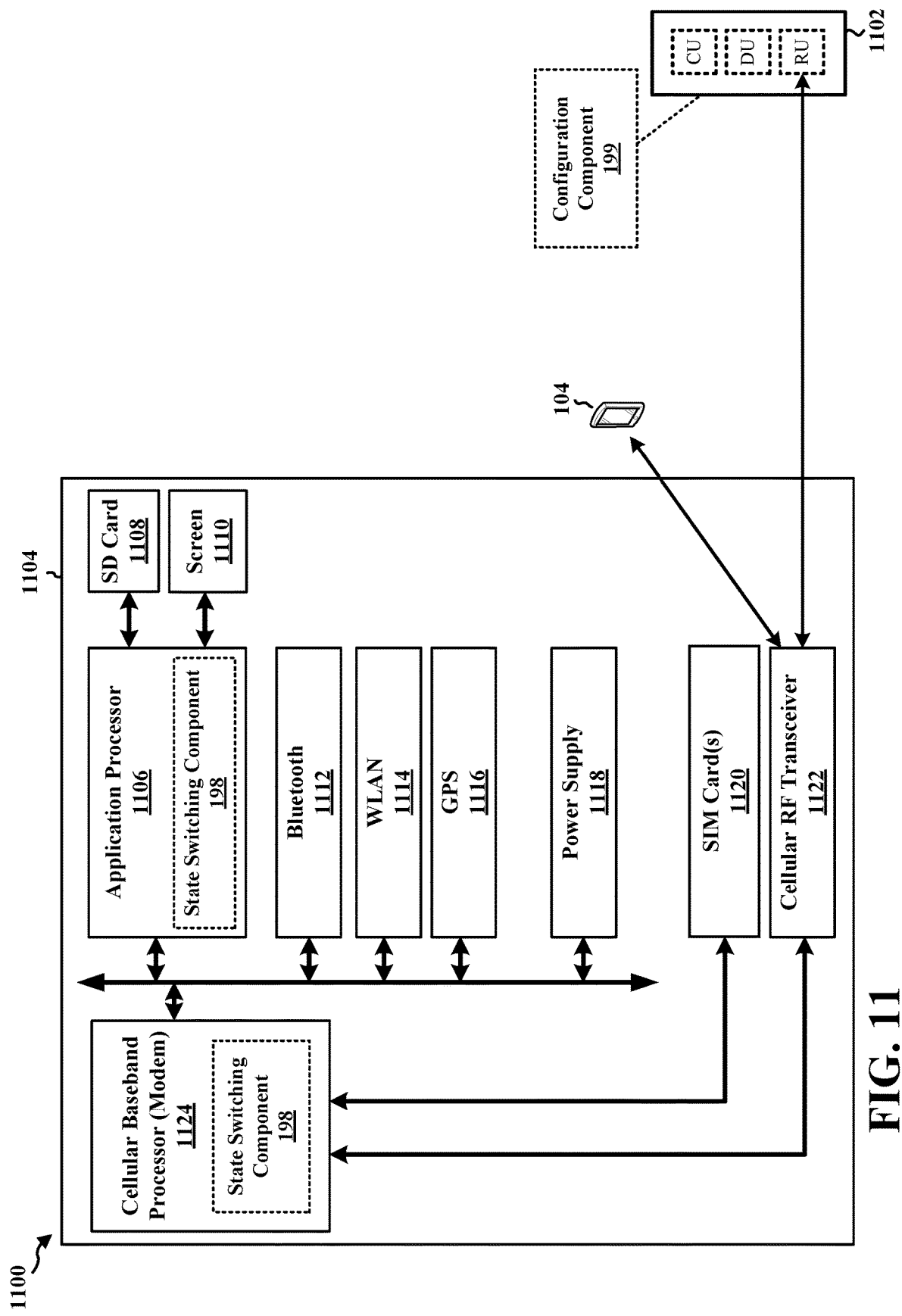
FIG. 11 is a diagram illustrating an example of a hardware implementation for an example apparatus and/or network entity.

FIG. 11 is a diagram 1100 illustrating an example of a hardware implementation for an apparatus 1104 and a network entity 1102. The apparatus 1104 may be a UE, a component of a UE, or may implement UE functionality. The network entity 1102 may be a BS, a component of a BS, or may implement BS functionality. In some aspects, the apparatus 1104 may include a cellular baseband processor 1124 (also referred to as a modem) coupled to a cellular RF transceiver 1122. In some aspects, the apparatus 1104 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1124 communicates through the cellular RF transceiver 1122 with the UE 104 and/or with an RU associated with the network entity 1102. The RU is either part of the network entity 1102 or is in communication with the network entity 1102. The network entity 1102 may include one or more of the CU, DU, and the RU. The cellular baseband processor 1124 and the application processor 1106 may each include a computer-readable medium/memory. Each computer-readable medium/memory may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the TX processor 368, the RX processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see 350 of FIG. 3) and include the additional modules of the apparatus 1104.

As discussed supra, the component 198 is configured to receive a configuration of one or more first parameters for control channel monitoring based on a first type of scheduling and one or more second parameters for the control channel monitoring based on a second type of scheduling; monitor for DCI of the first type of scheduling based on a first condition of a scheduling cell; switch from monitoring for the DCI of the first type of scheduling to monitoring for the DCI of the second type of scheduling based on a second condition of a scheduled cell; and receive scheduling information for at least one of a PDSCH or a PUSCH based on the second type of scheduling. The component 198 may be within the cellular baseband processor 1124, the application processor 1106, or both the cellular baseband processor 1124 and the application processor 1106. The component 198 may be one or more hardware components specifically configured to carry out the stated processes/algorithm, implemented by one or more processors configured to perform the stated processes/algorithm, stored within a computer-readable medium for implementation by one or more processors, or some combination thereof.

As shown, the apparatus 1104 may include a variety of components configured for various functions. In one configuration, the apparatus 1104, and in particular the cellular baseband processor 1124 and/or the application processor 1106, includes means for receiving a configuration of one or more first parameters for control channel monitoring based on a first type of scheduling and one or more second parameters for the control channel monitoring based on a second type of scheduling; means for monitoring for DCI of the first type of scheduling based on a first condition of a scheduling cell; means for switching from monitoring for the DCI of the first type of scheduling to monitoring for the DCI of the second type of scheduling based on a second condition of a scheduled cell; and means for receiving scheduling information for at least one of a PDSCH or a PUSCH based on the second type of scheduling. The apparatus 1104 further includes means for receiving a configuration for switching from monitoring for the DCI of the first type of scheduling to monitoring for the DCI of the second type. The means may be the component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

As discussed supra, the component 199 is configured to transmit a configuration to switch between monitoring for DCI of a first type of scheduling based on a first condition of a scheduling cell and monitoring for the DCI of a second type of scheduling based on a second condition of a scheduled cell; and schedule at least one of a PDSCH or a PUSCH based on the configuration to switch between the monitoring of the DCI of the first type of scheduling and the monitoring for the DCI of the second type of scheduling. The component 199 may be within one or more processors (e.g., BBU(s)) of one or more of the CU, DU, and the RU. The component 199 may be one or more hardware components specifically configured to carry out the stated processes/algorithm, implemented by one or more processors configured to perform the stated processes/algorithm, stored within a computer-readable medium for implementation by one or more processors, or some combination thereof.

The network entity 1102 may include a variety of components configured for various functions. In one configuration, the network entity 1102 includes means for transmitting a configuration to switch between monitoring for DCI of a first type of scheduling based on a first condition of a scheduling cell and monitoring for the DCI of a second type of scheduling based on a second condition of a scheduled cell; and means for scheduling at least one of a PDSCH or a PUSCH based on the configuration to switch between the monitoring of the DCI of the first type of scheduling and the monitoring for the DCI of the second type of scheduling. The apparatus 1104 further includes means for configuring one or more first parameters for control channel monitoring based on the first type of scheduling and one or more second parameters for the control channel monitoring based on the second type of scheduling. The means may be the component 199 of the network entity 1102 configured to perform the functions recited by the means. As described supra, the network entity 1102 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used in this disclosure outside of the claims, the phrase "based on" is inclusive of all interpretations and shall not be limited to any single interpretation unless specifically recited or indicated as such. For example, the phrase "based on A" (where "A" may be information, a condition, a factor, or the like) may be interpreted as: "based at least on A," "based in part on A," "based at least in part on A," "based only on A," or "based solely on A." Accordingly, as disclosed herein, "based on A" may, in one aspect, refer to "based at least on A." In another aspect, "based on A" may refer to "based in part on A." In another aspect, "based on A" may refer to "based at least in part on A." In another aspect, "based on A" may refer to "based only on A." In another aspect, "based on A" may refer to "based solely on A." In another aspect, "based on A" may refer to any combination of interpretations in the alternative. As used in the claims, the phrase "based on A" shall be interpreted as "based at least on A" unless specifically recited differently.

The following aspects are illustrative only and may be combined with other aspects or teachings described herein, without limitation.

Aspect 1 is an apparatus for wireless communication at a UE, comprising: a memory; and at least one processor coupled to the memory and, based at least in part on information stored in the memory, the at least one processor is configured to: receive a configuration of one or more first parameters for control channel monitoring based on a first type of scheduling and one or more second parameters for the control channel monitoring based on a second type of scheduling; monitor for DCI of the first type of scheduling based on a first condition of a scheduling cell; switch from monitoring for the DCI of the first type of scheduling to monitoring for the DCI of the second type of scheduling based on a second condition of a scheduled cell; and receive scheduling information for at least one of a PDSCH or a PUSCH based on the second type of scheduling.

Aspect 2 may be combined with aspect 1 and includes that the first type of scheduling corresponds to at least one of multi-cell scheduling or cross-carrier scheduling and the second type of scheduling corresponds to single-cell scheduling.

Aspect 3 may be combined with any of aspects 1-2 and includes that the first condition corresponds to first scheduling information for at least one of multiple carriers or multiple slots and the second condition corresponds to respective second scheduling information for at least one of individual carriers or individual slots.

Aspect 4 may be combined with any of aspects 1-3 and includes that the first type of scheduling corresponds to single-cell scheduling and the second type of scheduling corresponds to at least one of multi-cell scheduling or cross-carrier scheduling.

Aspect 5 may be combined with any of aspects 1-4 and includes that the first condition corresponds to respective first scheduling information for at least one of individual carriers or individual slots and the second condition corresponds to second scheduling information for at least one of multiple carriers or multiple slots.

Aspect 6 may be combined with any of aspects 1-5 and includes that the at least one processor is further configured to receive an additional configuration for switching from monitoring for the DCI of the first type of scheduling to monitoring for the DCI of the second type of scheduling, the additional configuration indicative of PDCCH monitoring parameters.

Aspect 7 may be combined with any of aspects 1-6 and includes that the first condition is associated with a first BWP of the scheduling cell and the second condition is associated with a second BWP of the scheduled cell.

Aspect 8 may be combined with any of aspects 1-7 and includes that the first condition is associated with a first SSS group and the second condition is associated with a second SSS group.

Aspect 9 may be combined with any of aspects 1-8 and includes that the first condition and the second condition are based on detection of scheduled data.

Aspect 10 may be combined with any of aspects 1-9 and includes that the second condition comprises a receipt of no scheduled data within a time period.

Aspect 11 may be combined with any of aspects 1-10 and includes that the switch in monitoring of the DCI for the first type of scheduling to the monitoring of the DCI for the second type of scheduling is based on an inactive period for one or more SCells.

Aspect 12 may be combined with any of aspects 1-11 and includes that the first condition is based on the one or more SCells being active, and the second condition is based on the one or more SCells being inactive.

Aspect 13 is an apparatus for wireless communication at a base station, comprising: a memory; and at least one processor coupled to the memory and, based at least in part on information stored in the memory, the at least one processor is configured to: transmit a configuration to switch between monitoring for DCI of a first type of scheduling based on a first condition of a scheduling cell and monitoring for the DCI of a second type of scheduling based on a second condition of a scheduled cell; and schedule at least one of a PDSCH or a PUSCH based on the configuration to switch between the monitoring of the DCI of the first type of scheduling and the monitoring for the DCI of the second type of scheduling.

Aspect 14 may be combined with aspect 13 and includes that the at least one processor is further configured to configure one or more first parameters for control channel monitoring based on the first type of scheduling and one or more second parameters for the control channel monitoring based on the second type of scheduling.

Aspect 15 may be combined with any of aspects 13-14 and includes that the first type of scheduling corresponds to at least one of multi-cell scheduling or cross-carrier scheduling and the second type of scheduling corresponds to single-cell scheduling.

Aspect 16 may be combined with any of aspects 13-15 and includes that the first condition corresponds to first scheduling information for at least one of multiple carriers or multiple slots and the second condition corresponds to respective second scheduling information for at least one of individual carriers or individual slots.

Aspect 17 may be combined with any of aspects 13-16 and includes that the first type of scheduling corresponds to single-cell scheduling and the second type of scheduling corresponds to at least one of multi-cell scheduling or cross-carrier scheduling.

Aspect 18 may be combined with any of aspects 13-17 and includes that the first condition corresponds to respective first scheduling information for at least one of individual carriers or individual slots and the second condition corresponds to second scheduling information for at least one of multiple carriers or multiple slots.

Aspect 19 may be combined with any of aspects 13-18 and includes that the configuration is indicative of PDCCH monitoring parameters.

Aspect 20 may be combined with any of aspects 13-19 and includes that the first condition is associated with a first BWP of the scheduling cell and the second condition is associated with a second BWP of the scheduled cell.

Aspect 21 may be combined with any of aspects 13-20 and includes that the first condition is associated with a first SSS group and the second condition is associated with a second SSS group.

Aspect 22 may be combined with any of aspects 13-21 and includes that the first condition and the second condition are based on detection of scheduled data.

Aspect 23 may be combined with any of aspects 13-22 and includes that the second condition comprises a receipt of no scheduled data within a time period.

Aspect 24 may be combined with any of aspects 13-23 and includes that the configuration to switch between monitoring the DCI for the first type of scheduling and monitoring the DCI for the second type of scheduling is based on an inactive period for one or more SCells.

Aspect 25 may be combined with any of aspects 13-24 and includes that the first condition is based on the one or more SCells being active, and the second condition is based on the one or more SCells being inactive.

Aspect 26 may be combined with any of aspects 1-25 and further includes at least one of an antenna or a transceiver coupled to the at least one processor.

Aspect 27 is a method of wireless communication for implementing any of aspects 1-25.

Aspect 28 is an apparatus for wireless communication including means for implementing any of aspects 1-25.

Aspect 29 is a non-transitory computer-readable medium storing computer executable code, the code when executed by at least one processor causes the at least one processor to implement any of aspects 1-25.

What is claimed is:

1. An apparatus for wireless communication at a user equipment (UE), comprising:
   memory; and
   at least one processor coupled to the memory and, based at least in part on information stored in the memory, the at least one processor is configured to:
      receive a configuration of one or more first parameters for control channel monitoring based on a first multi-cell and multi-slot scheduling and one or more second parameters for the control channel monitoring based on a second single-cell scheduling;
      monitor for downlink control information (DCI) of the first multi-cell and multi-slot scheduling based on a first condition of a scheduling cell;
      switch from monitoring for the DCI of the first multi-cell and multi-slot scheduling to monitoring for the DCI of the second single-cell scheduling based on a second condition of a scheduled cell; and
      receive scheduling information for at least one of a physical downlink shared channel (PDSCH) or a physical uplink shared channel (PUSCH) based on the second single-cell scheduling.

2. The apparatus of claim 1, wherein the first multi-cell and multi-slot scheduling comprises cross-carrier scheduling for a plurality of cells.

3. The apparatus of claim 2, wherein the first condition corresponds to first scheduling information for multiple carriers and multiple slots and the second condition corresponds to respective second scheduling information for at least one of individual carriers or individual slots.

4. The apparatus of claim 1, wherein the at least one processor is further configured to:
   receive an additional configuration for switching from monitoring for the DCI of the first multi-cell and multi-slot scheduling to monitoring for the DCI of the second single-cell scheduling, the additional configuration indicative of physical downlink control channel (PDCCH) monitoring parameters.

5. The apparatus of claim 1, wherein the first condition is associated with a first bandwidth part (BWP) of the scheduling cell and the second condition is associated with a second BWP of the scheduled cell.

6. The apparatus of claim 1, wherein the first condition is associated with a first search space set (SSS) group and the second condition is associated with a second SSS group.

7. The apparatus of claim 1, wherein the first condition and the second condition are based on detection of scheduled data.

8. The apparatus of claim 7, wherein the second condition comprises a receipt of no scheduled data within a time period.

9. The apparatus of claim 1, wherein the switch from monitoring for the DCI of the first multi-cell and multi-slot scheduling to the monitoring for the DCI of the second single-cell scheduling is based on an inactive period for one or more secondary cells (SCells).

10. The apparatus of claim 9, wherein the first condition is based on the one or more SCells being active, and the second condition is based on the one or more SCells being inactive.

11. An apparatus for wireless communication at a base station, comprising:
    memory; and
    at least one processor coupled to the memory and, based at least in part on information stored in the memory, the at least one processor is configured to:
        transmit a configuration to switch between monitoring for downlink control information (DCI) of a first multi-cell and multi-slot scheduling based on a first condition of a scheduling cell and monitoring for the DCI of a second single-cell scheduling based on a second condition of a scheduled cell; and
        schedule at least one of a physical downlink shared channel (PDSCH) or a physical uplink shared channel (PUSCH) based on the configuration to switch between the monitoring of the DCI of the first multi-cell and multi-slot scheduling and the monitoring for the DCI of the second single-cell scheduling.

12. The apparatus of claim 11, wherein the at least one processor is further configured to:
    configure one or more first parameters for control channel monitoring based on the first multi-cell and multi-slot scheduling and one or more second parameters for the control channel monitoring based on the second single-cell scheduling.

13. The apparatus of claim 11, wherein the first multi-cell and multi-slot scheduling comprises cross-carrier scheduling for a plurality of cells.

14. The apparatus of claim 13, wherein the first condition corresponds to first scheduling information for multiple carriers and multiple slots and the second condition corresponds to respective scheduling information for at least one of individual carriers or individual slots.

15. The apparatus of claim 11, wherein the configuration is indicative of physical downlink control channel (PDCCH) monitoring parameters.

16. The apparatus of claim 11, wherein the first condition is associated with a first bandwidth part (BWP) of the scheduling cell and the second condition is associated with a second BWP of the scheduled cell.

17. The apparatus of claim 11, wherein the first condition is associated with a first search space set (SSS) group and the second condition is associated with a second SSS group.

18. The apparatus of claim 11, wherein the first condition and the second condition are based on detection of scheduled data.

19. The apparatus of claim 18, wherein the second condition comprises a receipt of no scheduled data within a time period.

20. The apparatus of claim 11, wherein the configuration to switch between monitoring for the DCI of the first multi-cell and multi-slot scheduling and monitoring for the DCI of the second single-cell scheduling is based on an inactive period for one or more secondary cells (SCells).

21. The apparatus of claim 20, wherein the first condition is based on the one or more SCells being active, and the second condition is based on the one or more SCells being inactive.

22. A method of wireless communication at a user equipment (UE), comprising:
    receiving a configuration of one or more first parameters for control channel monitoring based on a first multi-cell and multi-slot scheduling and one or more second parameters for the control channel monitoring based on a second single-cell scheduling;
    monitoring for downlink control information (DCI) of the first multi-cell and multi-slot scheduling based on a first condition of a scheduling cell;
    switching from monitoring for the DCI of the first multi-cell and multi-slot scheduling to monitoring for the DCI of the second single-cell scheduling based on a second condition of a scheduled cell; and
    receiving scheduling information for at least one of a physical downlink shared channel (PDSCH) or a physical uplink shared channel (PUSCH) based on the second single-cell scheduling.

23. The method of claim 22, wherein the first multi-cell and multi-slot scheduling comprises cross-carrier scheduling for a plurality of cells.

24. The method of claim 23, wherein the first condition corresponds to first scheduling information for multiple carriers and multiple slots and the second condition corresponds to respective second scheduling information for at least one of individual carriers or individual slots.

25. A method of wireless communication at a base station, comprising:
    transmitting a configuration to switch between monitoring for downlink control information (DCI) of a first multi-cell and multi-slot scheduling based on a first condition of a scheduling cell and monitoring for the DCI of a second single-cell scheduling based on a second condition of a scheduled cell; and
    scheduling at least one of a physical downlink shared channel (PDSCH) or a physical uplink shared channel (PUSCH) based on the configuration to switch between the monitoring of the DCI of the first multi-cell and multi-slot scheduling and the monitoring for the DCI of the second single-cell scheduling.

26. The method of claim 25, further comprising:
    configuring one or more first parameters for control channel monitoring based on the first multi-cell and multi-slot scheduling and one or more second parameters for the control channel monitoring based on the second single-cell scheduling.

* * * * *